United States Patent
Ogawa et al.

(10) Patent No.: US 8,644,361 B2
(45) Date of Patent: Feb. 4, 2014

(54) TERMINAL APPARATUS, BASE STATION APPARATUS, PILOT TRANSMITTING METHOD, AND PROPAGATION PATH ESTIMATING METHOD

(75) Inventors: Yoshihiko Ogawa, Kanagawa (JP); Takashi Iwai, Ishikawa (JP); Akihiko Nishio, Kanagawa (JP); Seigo Nakao, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/634,600

(22) PCT Filed: Mar. 17, 2011

(86) PCT No.: PCT/JP2011/001589
§ 371 (c)(1),
(2), (4) Date: Sep. 13, 2012

(87) PCT Pub. No.: WO2011/121925
PCT Pub. Date: Oct. 6, 2011

(65) Prior Publication Data
US 2013/0010833 A1    Jan. 10, 2013

(30) Foreign Application Priority Data
Mar. 29, 2010  (JP) .................................. 2010-075243

(51) Int. Cl.
*H04B 1/00* (2006.01)
(52) U.S. Cl.
USPC ............ 375/134; 375/137; 375/362; 370/500; 370/512
(58) Field of Classification Search
USPC ......... 375/130, 132–137, 145, 149, 354, 362, 375/364; 370/500, 503, 509, 510, 512
See application file for complete search history.

(56) References Cited

U.S. PATENT DOCUMENTS
8,379,583 B2 *  2/2013  Gorokhov et al. ............ 370/329
(Continued)

FOREIGN PATENT DOCUMENTS
| CN | 101874358 A | 10/2010 |
| JP | 2009-89190 A | 4/2009 |
| WO | 2009/084224 A1 | 7/2009 |

OTHER PUBLICATIONS

TS36.211 v8.9.0, "3GPP TSG RAN; Evolved Universal Terrestrial Radio Access (E-UTRA); Physical Channels and Modulation".
R1-074278, NTT DoCoMo, "Hopping and Planning of Sequence Groups for Uplink RS," 3GPP TSG RAN WG1 Meeting #50bis.

(Continued)

*Primary Examiner* — Dac Ha
(74) *Attorney, Agent, or Firm* — Pearne & Gordon LLP

(57) ABSTRACT

Provided is a terminal apparatus that can suppress the increase in interference between pilot signals in the same slot, while also suppressing the degradation of the flexibility to design cell cluster structures. When hopping information indicates an inter-slot hopping, a mapping unit (212) arranges a first pilot sequences in which a group to which the sequences used in respective slots belong varies on a slot-by-slot basis. When the hopping information indicates an inter-subframe hopping, the mapping unit (212) arranges a second pilot sequences in which a group to which the sequences used in respective slots belong varies on a subframe-by-subframe basis. The sequence group to which the sequences used in any one of the subframes in the second pilot sequences belong is identical with the sequence group to which the sequence used in any one of the slots included in that one subframe in the first pilot sequences belongs.

10 Claims, 10 Drawing Sheets

(56) References Cited

U.S. PATENT DOCUMENTS

| | | | |
|---|---|---|---|
| 2007/0248147 A1* | 10/2007 | Tiirola et al. | 375/135 |
| 2008/0187027 A1* | 8/2008 | Malladi | 375/135 |
| 2010/0272022 A1 | 10/2010 | Iwai et al. | |
| 2010/0272152 A1 | 10/2010 | Kishiyama et al. | |
| 2011/0007779 A1* | 1/2011 | Nanri | 375/133 |

OTHER PUBLICATIONS

R1-101075, Huawei, "Impacts of OCC on UL DM RS for LTE-A," 3GPP TSG RAN WG1 Meeting #60.

International Search Report for PCT/JP2011/001589 dated Apr. 12, 2011.

* cited by examiner

FIG.1

| RB# | N | u |
|---|---|---|
| 3 | 31 | 1 |
| 4 | 47 | 1 |
| 5 | 59 | 1 |
| 6 | 71 | 1 2 |
| . | . | . |
| . | . | . |

|1/31 − u/N| ≦ 1/60

SEQUENCE GROUP1

| RB# | N | u |
|---|---|---|
| 3 | 31 | 2 |
| 4 | 47 | 2 3 |
| 5 | 59 | 2 3 |
| 6 | 71 | 3 4 |
| . | . | . |
| . | . | . |

|2/31 − u/N| ≦ 1/60

SEQUENCE GROUP2

TERMINAL APPARATUS, BASE STATION APPARATUS, PILOT TRANSMITTING METHOD, AND PROPAGATION PATH ESTIMATING METHOD

TECHNICAL FIELD

The present invention relates to a terminal apparatus, a base station apparatus, a pilot transmitting method, and a channel estimating method.

BACKGROUND ART

In an uplink of 3GPP LTE (3rd Generation Partnership Project Long-Term Evolution, hereinafter referred to as "LTE"), a ZC (Zadoff-Chu) sequence, which is one of CAZAC (Constant Amplitude and Zero Auto-correlation Code) sequences, is adopted as a pilot signal. A frequency domain of the ZC sequence is represented by following equation 1.

(Equation 1)

$$F_u(k) = \begin{cases} \exp\left\{\frac{-j2\pi u}{N}\left(\frac{k(k+1)}{2} + pk\right)\right\}, \text{ when } N \text{ is odd} \\ \exp\left\{\frac{-j2\pi u}{N}\left(\frac{k^2}{2} + pk\right)\right\}, \text{ when } N \text{ is even} \end{cases} \quad [1]$$

$$k = 0, 1, \ldots, N-1$$

In equation 1, N is a sequence length, u is a ZC sequence index of a frequency domain, and p is an arbitrary integer (p=0 in general).

In the uplink of LTE, the ZC sequence having an odd-number sequence length N is used because there are a large number of ZC sequences with low cross-correlation. In the following, a case will be explained where the ZC sequence having an odd-number sequence length N is adopted.

Also, in the uplink of LTE, a large number of ZC sequences are divided into thirty sequence groups. The sequence groups are allocated to different cells. Each sequence group includes sequences with high correlation. Accordingly, since the probability that adjacent cells use the sequences with high correlation is reduced, the interference between the adjacent cells is reduced. In this case, the sequences with high correlation mean sequences having a similar u/N (u: sequence index and N: sequence length). When inter-sequence interference is low, it is difficult to demultiplex the sequences having a similar u/N.

In each sequence group, an allocation bandwidth (in particular, the number of allocation resource blocks (RBs)) is associated with one or two sequences. To be more specific, one sequence is associated with each number of RB for the allocation bandwidth of 5 RBs or less, and two sequences are associated with each number of RB for the allocation bandwidth of 6 RBs or more.

FIG. 1 illustrates the sequence groups adopted in the uplink of LTE. Focusing on each sequence group as illustrated in FIG. 1, for the allocation bandwidth of 5 RBs or less, only a sequence index u corresponding to a u/N that is closest to a u/N (for example, u=1 and N=31 in sequence group 1) obtained when the number of RB is 3 (hereinafter, this sequence is referred to as "#A") is allocated to the number of RB. Meanwhile, for 6 RBs or more, a sequence index u corresponding to u/N that is second closest (hereinafter, this sequence is referred to as "#B") is also allocated to the number of RB besides the above #A. Although one sequence is allocated to each of 1 RB and 2 RBs, the allocated sequences are different from the ZC sequences and therefore the description thereof will be omitted.

Inter-slot hopping is applied to a pilot signal in the uplink of LTE (see, for example, non-patent literature 2). A sequence group including the sequence used as the pilot signal discreetly changes among slots (that is, performs hopping). This inter-slot hopping pattern is cell specific. Thus, the inter-slot hopping randomizes inter-cell interference.

To be more specific, the patterns of the inter-slot hopping (hereinafter, referred to as "inter-slot hopping pattern.") include pairs of seventeen hopping patterns and thirty shifting patterns. The same hopping pattern is applied in each cell in one cell cluster (in other words, cells forming one group), but different hopping patterns are applied in cells in different cell clusters. In the one cell cluster, a different shifting pattern is applied in each cell. In particular, in FIG. 2, the same hopping pattern (+2, +3, +3, . . . ) is applied in cell#1 and cell#2 that belong to the one cell cluster. Meanwhile, as the first sequence group, SG#1 is set in cell#1 while SG#2 is set in cell#2. This means that the shifting patterns applied in the cells belonging to the one cell cluster are different. Specifically, the shifting pattern can be considered as an initial value of the inter-slot hopping pattern.

The inter-slot hopping described above can prevent the same sequence group from being used in the same slot in a single cell cluster. Meanwhile, among different cell clusters, the same sequence group may be used in the same slot. However, since the cell clusters use different hopping patterns in this case, it is possible to prevent the same sequence group from being continuously used in a plurality of slots between any cells. Also, a base station can select whether or not to apply (enable or disable) the inter-slot hopping. The base station notifies terminals of this selection result through higher layer signaling. In case of applying the inter-slot hopping, there is no need to change the above sequences #A and #B for each slot and therefore only sequence #A is used. This is because the sequence groups are different between predetermined slots according to the inter-slot hopping, and therefore the sequences applied to the following slots are also different.

In case of applying the above inter-slot hopping, different sequence groups are used between the slots. Thus, focusing on a certain cell, interference to a pilot signal transmitted in the cell from other pilot signals (that is, inter-sequence interference) differs in each slot.

Furthermore, LTE-Advanced (hereinafter, referred to as "LTE-A") aims at further reduction of the inter-sequence interference of the pilot signal in uplink. Using OCC (orthogonal cover code), which is an orthogonal sequence, in combination with the above ZC sequence to reduce the inter-sequence interference is under study. The multiplexing scheme adopting this OCC multiplies pilot signals mapped to continuous two slots by w1=[1 1] or w2=[1 −1] (see FIG. 3). When multiplied by w1, the same pilot signals as the conventional pilot signals are mapped in the first and second slots. Meanwhile, when multiplied by w2, the same pilot signal as the conventional one is mapped in the first slot and a pilot signal whose phase is inverted (that is, rotated by 180 degrees) is mapped in the second slot. In LTE, the scheduling is performed on a subframe basis. The subframe is composed of two slots.

A reception side of the pilot signal performs channel estimation by multiplying the symbols to which the pilot signals are mapped in two slots by a complex conjugate of the ZC sequence, and multiplies the acquired channel estimation value by a complex conjugate of OCC for combination. By this means, a channel estimation value of the desired component is combined in-phase and a channel estimation value of the interference component is combined out-of-phase and removed. When the same ZC sequences is used in two slots, the channel estimation may be performed by multiplying a symbol to which a pilot signal is mapped in each slot by the complex conjugate of OCC for combination and then multiplying the result by the complex conjugate of the ZC sequence.

However, when inter-sequence interference (interference component) among the pilot signals is different in each slot due to the application of the above inter-slot hopping, the interference component is not combined out-of-phase and therefore the interference component cannot be removed. For example, even when UE#0 transmits a pilot signal multiplied by OCC sequence w1 and when UE#1 transmits a pilot signal multiplied by OCC sequence w2, a large number of interference components remain in each received pilot signal subjected to demultiplexing processing at the reception side. Also, since each cell uses the same sequence group without the application of the above described inter-slot hopping, the inter-cell interference cannot be randomized and the inter-sequence interference obviously occurs.

To solve this kind of problem, non-patent literature 3 proposes addition of inter-subframe hopping in LTE-Advanced. As the inter-slot hopping, this inter-subframe hopping is also set by the higher layer signaling or PDCCH. To be more specific, the inter-slot hopping performs hopping of the sequence group among slots and the inter-subframe hopping performs hopping of the sequence group among subframes. That is, the inter-slot hopping is identical to the inter-subframe hopping but differs in whether a hopping unit is based on a slot or a subframe. According to the inter-subframe hopping, the inter-cell interference of the pilot signals can be randomized for a terminal to which a data transmitting resource is allocated over a plurality of subframes (for example, a retransmission terminal and a persistent terminal). Also, according to the inter-subframe hopping, since the slots use the same sequence group, the OCC can orthogonalize the pilot signals mapped to consecutive slots.

CITATION LIST

Patent Literature

PTL 1
Japanese Patent Application Laid-Open No. 2009-89190

Non-Patent Literature

NPL 1
TS36.211 v8.9.0, "3GPP TSG RAN; Evolved Universal Terrestrial Radio Access (E-UTRA); Physical Channels and Modulation"

NPL 2
R1-074278, NTT DoCoMo, "Hopping and Planning of Sequence Groups for Uplink RS," 3GPP TSG RAN WG1 Meeting #50bis NFL 3
R1-101075, Huawei, "Impacts of OCC on UL DM RS for LTE-A," 3GPP TSG RAN WG1 Meeting #60

SUMMARY OF INVENTION

Technical Problem

An LTE-A system follows an LTE system. During the transition to the LTE-A system, an LTE terminal and an LTE-A terminal exist together.

The LTE terminal cannot use the inter-subframe hopping. Thus, in the phase when the LTE terminal and the LTE-A terminal exist together, a terminal using the inter-slot hopping and a terminal using the inter-subframe hopping are mixed in a single cell. As a result, as illustrated in FIG. 4, two kinds of sequence groups are used in one slot in the single cell.

When two kinds of sequence groups are used in one slot of the single cell, the probability that the same sequence group is used in one slot of adjacent cells increases. Accordingly, the inter-cell interference is more likely to increase.

In contrast, it is possible to plan all cells in a single cell cluster to use different sequence groups. However, in this case, fifteen or more cells cannot be allocated in a single cell cluster, taking into consideration the usage of two sequence groups in one slot by a single cell. Consequently, the flexibility of designing a cell cluster structure is reduced. This is because the usage of two sequence groups by each of fifteen cells in the single cell cluster results in thirty sequence groups defined by LTE.

It is an object of the present invention to provide a terminal apparatus, a base station apparatus, a pilot transmitting method, and a channel estimating method capable of suppressing increase of interference among pilot signals in identical slots and also suppressing reduction in the flexibility of designing the cell cluster structure even when the inter-slot hopping and the inter-subframe hopping are applied.

Solution to Problem

According to an aspect of the present invention, the terminal apparatus includes: a reception section that receives a control signal including hopping information; a generation section that generates a first pilot sequence in which a group including a sequence used in each slot changes on a slot basis when the hopping information indicates inter-slot hopping, and generates a second pilot sequence in which a group including a sequence used in each slot changes on a subframe basis when the hopping information indicates inter-subframe hopping; and a transmission section that transmits a signal including the first pilot sequence or the second pilot sequence generated by the generation section, where a sequence group including sequences used in any subframe in the second pilot sequence is identical to a sequence group including sequences used in any one of the slots included in the subframe in the first pilot sequence.

According to an aspect of the present invention, the base station apparatus includes: a setting section that sets a hopping type of a pilot signal transmitted by a terminal to the terminal; and an estimation section that performs channel estimation between the terminal and the base station using a first pilot sequence in which a group including a sequence used in each slot changes on a slot basis when the set hopping type is inter-slot hopping, and performs channel estimation between the terminal and the base station using a second pilot sequence in which a group including a sequence used in each slot changes on a subframe basis when the set hopping type is inter-subframe hopping, where a sequence group including sequences used in any subframe in the second pilot sequence is identical to a sequence group including sequences used in any one of the slots included in the subframe in the first pilot sequence.

According to an aspect of the present invention, the pilot transmitting method includes the steps of: receiving a control signal including hopping information; generating a first pilot sequence in which a group including a sequence used in each slot changes on a slot basis when the hopping information indicates inter-slot hopping, and generating a second pilot sequence in which a group including a sequence used in each slot changes on a subframe basis when the hopping information indicates inter-subframe hopping; and transmitting a signal including the generated first pilot sequence or the generated second pilot sequence, where a sequence group including sequences used in any subframe in the second pilot sequence is identical to a sequence group including sequences used in any one of the slots included in the subframe in the first pilot sequence.

According to an aspect of the present invention, the channel estimating method includes the steps of: setting a hopping type of a pilot signal transmitted by a terminal to the terminal; and performing channel estimation using a first pilot sequence in which a group including a sequence used in each slot changes on a slot basis when the set hopping type is inter-slot hopping, and performing channel estimation using a second pilot sequence in which a group including a sequence used in each slot, changes on a slot basis when the set hopping type is inter-subframe hopping, where a sequence group including sequences used in any subframe in the second pilot sequence is identical to a sequence group including sequences used in any one of slots included in the subframe in the first pilot sequence.

Advantageous Effects of Invention

According to the present invention, it is possible to provide a terminal apparatus, a base station apparatus, a pilot transmitting method, and a channel estimating method capable of suppressing increase of interference among pilot signals in the identical slots and also suppressing reduction in the flexibility of designing a cell cluster structure even when the inter-slot hopping and the inter-subframe hopping are applied.

BRIEF DESCRIPTION OF DRAWINGS

FIG. 1 shows a sequence group used in an uplink of LTE.

DESCRIPTION OF EMBODIMENT

Figure 2A:
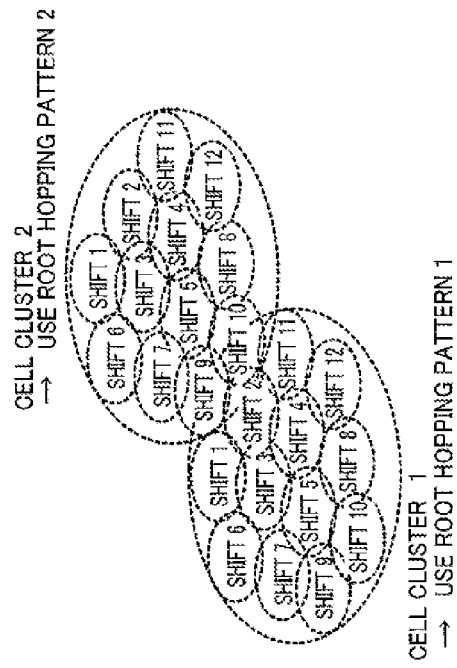
FIG. 2 shows inter-slot hopping.
Figure 2B:
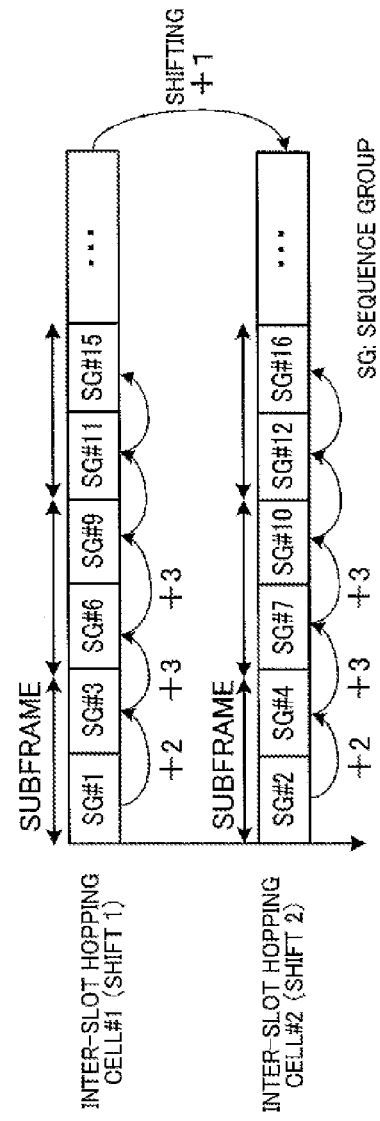
Figure 3:
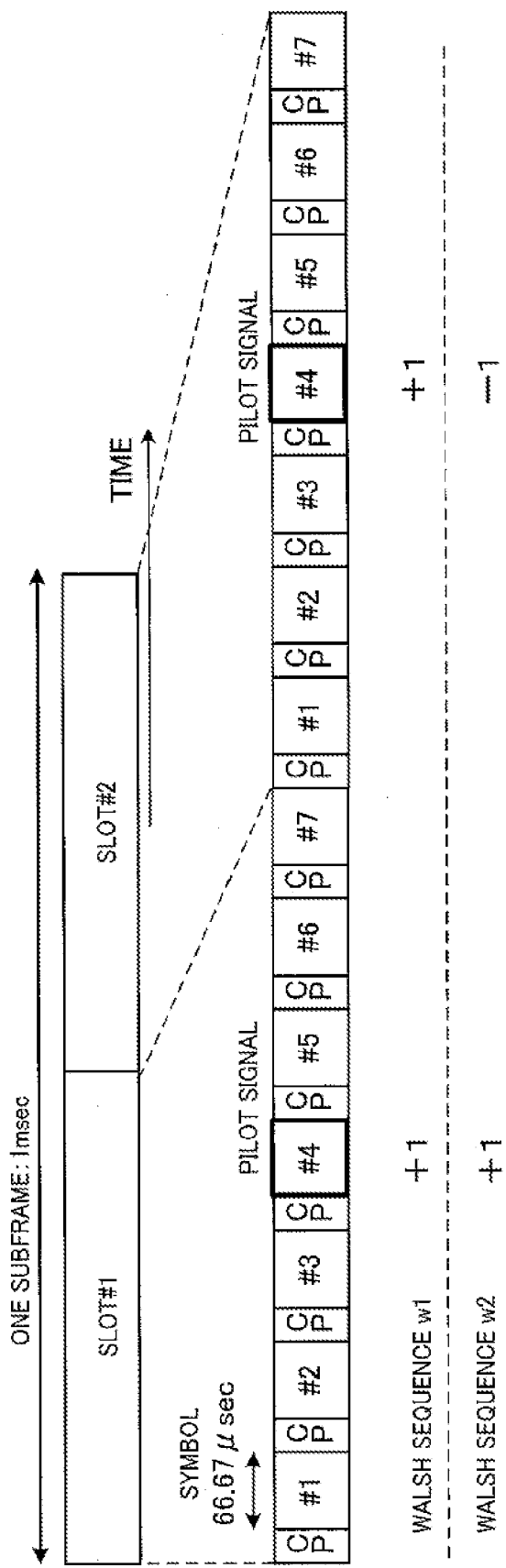
FIG. 3 shows a multiplexing method using OCC.
Figure 4A:
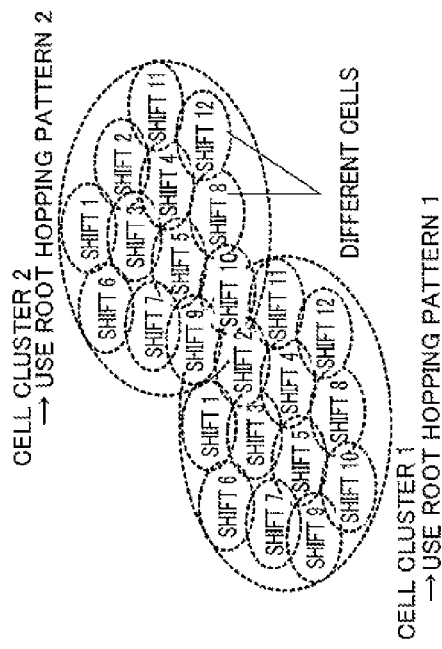
FIG. 4 shows inter-subframe hopping.
Figure 4B:
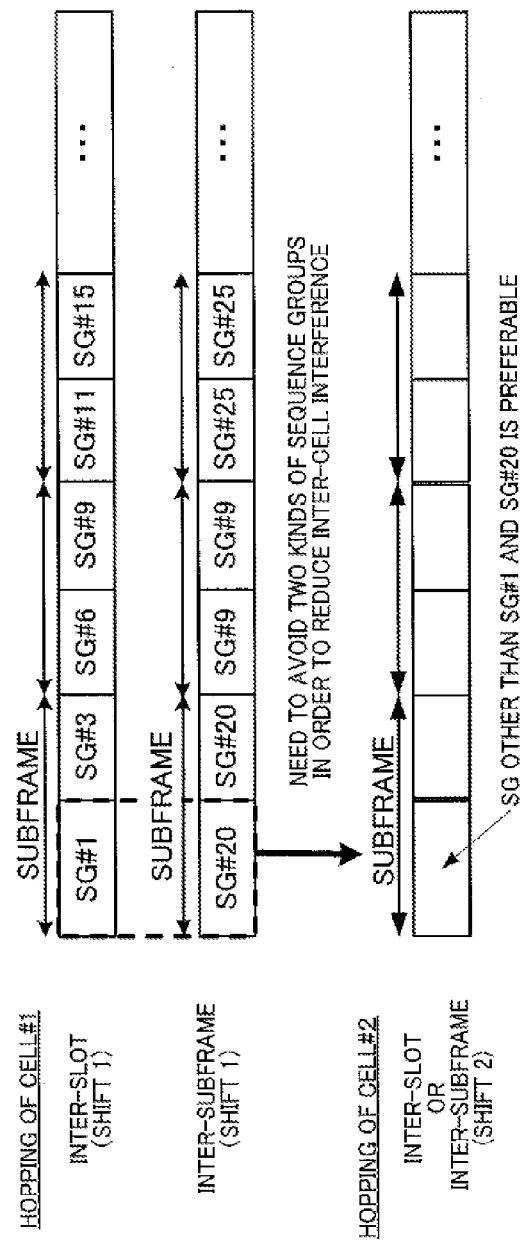

Now, an embodiment of the present invention will be explained in detail with reference to the accompanying drawings. Here, in embodiments, the same components are denoted by the same reference numerals and their overlapping explanations are omitted.

Summary of System

In a communication system including base station 100 and terminal 200 (described later), communication using a plurality of downlink component bands (component carrier (CC)), that is, the communication based on carrier aggregation is performed.

Depending on resource allocation to terminal 200 by base station 100, it is also possible to perform communication not based on the carrier aggregation between base station 100 and terminal 200.

An FDD system for LTE and LTE-A is assumed in the following description. An LTE terminal can only use the inter-slot hopping, and an LTE-A terminal can use both the inter-slot hopping and the inter-subframe hopping. Also, a single component carrier is assumed in the following description.

Configuration of Base Station 100

Figure 5:
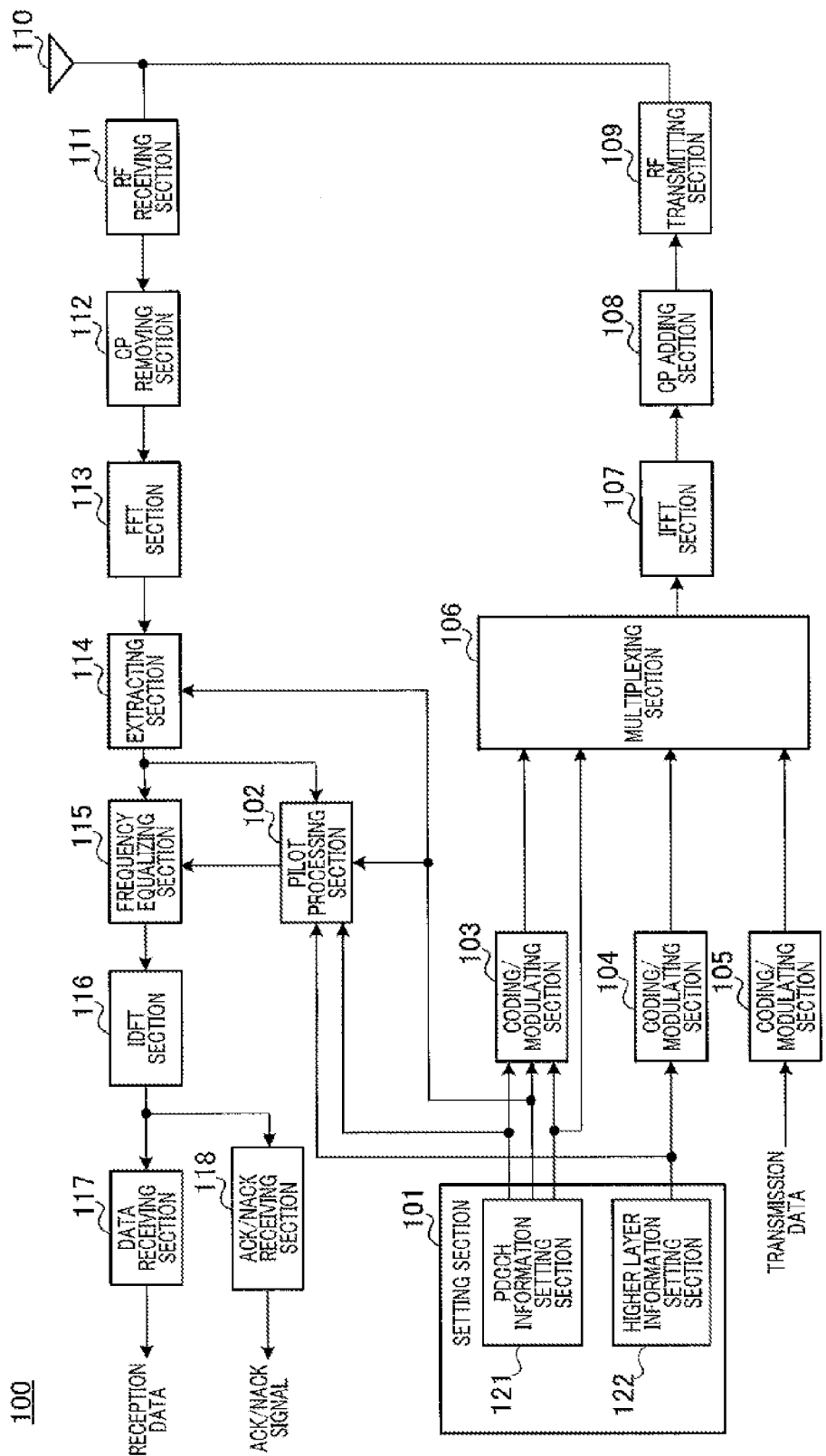
FIG. 5 is a block diagram showing a configuration of a base station according to an embodiment of the present invention.

FIG. 5 is a block diagram showing a configuration of base station 100 according to an embodiment of the present invention. In FIG. 5, base station 100 includes setting section 101, pilot processing section 102, coding/modulating sections 103, 104, and 105, multiplexing section 106, IFFT (Inverse Fast Fourier Transform) section 107, CP (Cyclic Prefix) adding section 108, RF transmitting section 109, antenna 110, RF receiving section 111, CP removing section 112, FFT (Fast Fourier Transform) section 113, extraction section 114, frequency equalizing section 115, IDFT (Inverse Discrete Fourier Transform) section 116, data receiving section 117, and ACK/NACK receiving section 118. Base station 100 represents, for example, an LTE-A base station.

Based on, for example, the type of a setting-target terminal (an LTE terminal or an LTE-A terminal) and the state of inter-cell interference, setting section 101 sets whether or not to apply hopping on transmitting a pilot signal of the setting-target terminal (that is, to enable/disable the hopping). When enabling hopping, setting section 101 further sets the inter-slot hopping or the inter-subframe hopping as the type of hopping and sets the initial value of the hopping, based on, for example, the type of the setting-target terminal (an LTE terminal or an LTE-A terminal) and the state of the inter-cell interference. The pattern of the inter-slot hopping and the inter-subframe hopping set herein depends on a cell ID.

The hopping enable/disable information, hopping type information (the information indicating the type of hopping: hereinafter, referred to as "hopping information"), the initial value of the hopping, and the cell ID are setting information. The setting information is notified to terminals through coding/modulating section 104 as control information (that is, RRC control information) in a higher layer, and is output to pilot processing section 102. When a plurality of component carriers are used in communication between base station 100 and terminal 200, setting section 101 also sets the component carriers.

Also, setting section 101 generates allocation control information for each allocation target terminal. This allocation control information includes, for example, MCS information, HARQ information, uplink allocation information representing uplink resource (for example, PUSCH (Physical Uplink Shared Channel)) for allocating uplink data of a terminal, and downlink allocation information representing downlink resource (for example, PDSCH (Physical Downlink Shared Channel)) for allocating downlink data addressed to a terminal. Furthermore, when OCC is applied, this allocation control information also in eludes OCC information indicating whether w1 or w2 is allocated as OCC to the allocation target terminal.

Setting section 101 generates a PDCCH (Physical Downlink Control Channel) signal including terminal-specific allocation control information (that is, the allocation control information including, for example, uplink resource allocation information, downlink resource allocation information, MCS information, HARQ information, and OCC information, for each allocation target terminal).

In particular, setting section 101 includes PDCCH information setting section 121 and higher layer information setting section 122. PDCCH information setting section 121 generates the above allocation control information, and higher layer information setting section 122 sets the above setting information.

Setting section 101 then outputs terminal-specific allocation control information to coding/modulating section 103. From the allocation control information, setting section 101 extracts and outputs uplink resource allocation information to extraction section 114 and pilot processing section 102, extracts and outputs downlink resource allocation information to multiplexing section 106, and extracts and outputs OCC information to pilot processing section 102. Here, although the OCC information is transmitted to terminal 200 as the allocation control information, the OCC information may be implicitly notified in association with other information. For example, this other information is CS (Cyclic Shift) information of the pilot signal. In this case, a CS index of the CS information is associated with an OCC index, and terminal 200 accordingly specifies the OCC index from the received CS index. That is, base station 100 implicitly notifies terminal 200 of the OCC index using the CS information. By this means, there is no need to notify the OCC information itself, which makes it possible to reduce traffic.

After channel coding, coding/modulating section 103 modulates the PDCCH signal received from setting section 101 and outputs the modulated PDCCH signal to multiplexing section 106. Based on CQI (Channel Quality Indicator) information notified from each terminal, coding/modulating section 103 sets a coding rate in order that each terminal can acquire efficient reception quality. For example, coding/modulating section 103 sets a lower coding rate for a terminal located nearer a cell edge (i.e., a terminal having lower channel quality).

After channel coding, coding/modulating section 104 modulates setting information received from setting section 101 and outputs the modulated setting information to multiplexing section 106.

In each component carrier coding/modulating section 105 modulates transmission data received as input (downlink data) after channel coding, and outputs the modulated transmission data signal to multiplexing section 106.

Although three coding/modulating sections 103, 104, and 105 are provided separately in FIG. 5, these sections may be provided as one coding/modulating section appropriately performing coding and modulating the received information and signal.

At each component carrier, multiplexing section 106 multiplexes a PDCCH signal received from coding/modulating section 103, setting information input from coding/modulating section 104 and a data signal (i.e., PDSCH signal) input from coding/modulating section 105. Here, based on the downlink resource allocation information input from setting section 101, multiplexing section 106 maps the PDCCH signal and the data signal (PDSCH signal) to PDCCH and PDSCH respectively, and multiplexes the PDCCH signal and the data signal. Multiplexing section 106 may map setting information to PDSCH, the setting information being generally to be mapped to a control information channel such as PDCCH. Multiplexing section 106 then outputs the multiplexed signal to IFFT section 107.

IFFT section 107 transforms the multiplexed signal input from multiplexing section 106 into a time domain waveform and outputs the result to CP adding section 108.

CP adding section 108 generates an OFDM signal by adding a CP to this time domain waveform received from IFFT section 107 and outputs the OFDM signal to RE transmitting section 109.

RF transmitting section 109 performs transmission radio processing (such as up-conversion and a digital-to-analog (D/A) conversion) to an OFDM signal input from CP adding section 108, and transmits the result through antenna 110. Although a single antenna is provided in this case, a plurality of antennas may be provided.

RF receiving section 111 performs receiving radio processing (such as a down-conversion and an analog-to-digital (A/D) conversion) to a received radio signal received in a receiving band through antenna 110, and outputs the received signal to CP removing section 112.

CP removing section 112 removes a CP from the received signal, and FFT section 113 transforms the received signal after the removal of CP into a frequency domain signal.

Based on the uplink resource allocation information input from setting section 101, extraction section 114 extracts uplink data from the frequency domain signal input from FFT section 113, outputs a pilot signal included in the uplink data to pilot processing section 102, and outputs other data signal and control information to frequency equalizing section 115.

Pilot processing section 102 estimates the channel condition between the base station itself and the above setting-target terminal (that is, performs channel estimation), using the hopping enable/disable information set and output by setting section 101, the hopping information, the initial value of hopping, and a sequence according to the cell ID. Pilot processing section 102 operates as an estimation section.

To be more specific, when the hopping information indicates the inter-slot hopping, pilot processing section 102 uses "first type pilot sequence" in which a group including a sequence used in each slot changes on a slot basis (hereinafter, referred to as "first pilot sequence"). Meanwhile, when the hopping information indicates the inter-subframe hopping, pilot processing section 102 uses "second type pilot sequence" in which a group including the sequence used in each slot changes on a subframe basis (hereinafter, referred to as "second pilot sequence"). Here, the following relationship is established between "first pilot sequence" and "second pilot sequence" that are used for the channel estimation between any setting target terminal and a base station apparatus itself. That is a sequence group including sequences used in any subframe in the second pilot sequence is identical to a sequence group including sequences used in any one of slots included in the subframe in the first pilot sequence. This relationship between "first pilot sequence" and "second pilot sequence" will be described later.

In particular, pilot processing section 102 drives a sequence group to be used for channel estimation, based on the hopping enable/disable information, the initial value of hopping, and the cell ID among the setting information received from setting section 101. Pilot processing section 102 drives a sequence allocated from the derived sequence group using transmission bandwidth (corresponding to the number of allocation resource blocks) information of the uplink resource allocation information received from setting section 101, and also drives a sequence length. As a correspondence among the sequence groups, the transmission bandwidths, and the sequences, or example, the relationship described, in non-patent literature 1 is used. Pilot processing section 102 estimates the channel condition by multiplying the pilot signal received from extraction section 114 by a complex conjugate of the above derived sequence and eliminating an interference component. The estimation value thus acquired is output to frequency equalizing section 115.

Here, to be more specific, the above described first pilot sequence and second pilot sequence are each formed as follows. When the hopping enable/disable information indicates to enable the hopping, a hopping pattern is defined based on the cell ID. From the initial value of the sequence group, the hopping of a sequence group index of a sequence among slots or among subframes according to the defined hopping pattern, and forms the first pilot sequence or the second pilot sequence is formed. When the hopping enable/disable information indicates to disable the hopping, the sequence group index indicated by the initial value of the sequence group is used over a plurality of subframes.

When the OCC is applied, pilot processing section 102 acquires a channel estimation value in a state where the inter-sequence interference is reduced, by combining the result acquired by multiplying channel estimation values of the above estimated two slots by w1 or w2, based on the OCC information (that is, the information of whether w1 or w2 to be used) received from setting section 101.

Frequency equalizing section 115 performs frequency equalization processing on the data signal and control information output from extraction section 114 using the channel estimation value estimated by the pilot processing section, and outputs the data signal and control information subjected to the frequency equalization processing to IDFT section 116.

IDFT section 116 transforms the data signal and control information output from frequency equalizing section 115 into a time domain signal, and outputs the resulting time domain signal to data receiving section 117 and ACK/NACK receiving section 118.

Data receiving section 117 decodes the time domain signal received from IDFT section 116. Then, data receiving section 117 outputs the decoded time domain signal as reception data.

ACK/NACK receiving section 118 extracts an ACK/NACK signal for downlink data from the time domain signal received from IDFT section 116 and makes an ACK/NACK decision of the extracted ACK/NACK signal.

Configuration of Terminal 200

Figure 6:
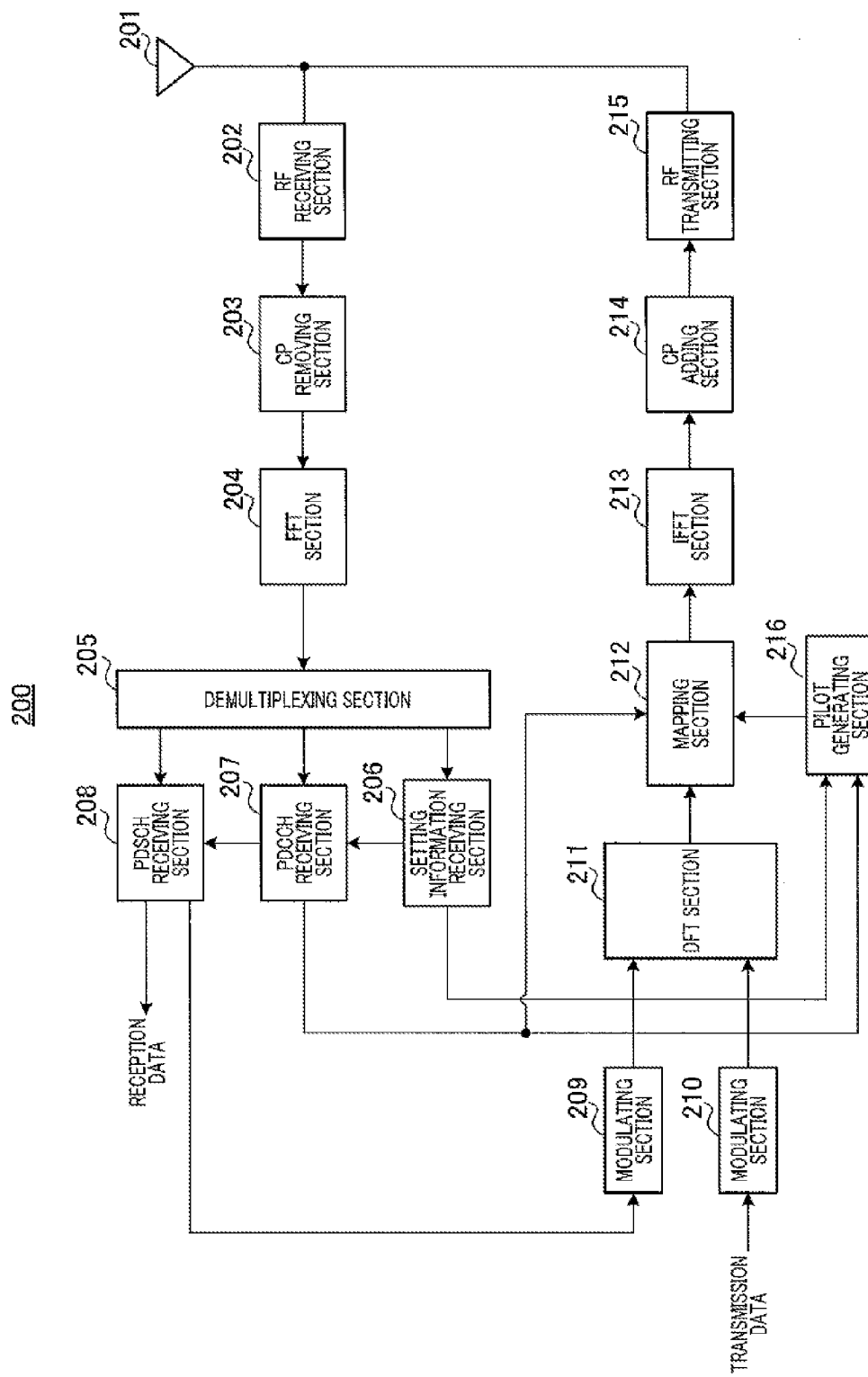
FIG. 6 is a block diagram showing a configuration of a terminal according to an embodiment of the present invention.

FIG. 6 is a block diagram showing a configuration of terminal 200 according to an embodiment of the present invention, In FIG. 6, terminal 200 includes antenna 201, RE receiving section 202, CP removing section 203, FFT section 204, demultiplexing section 205, setting information receiving section 206, PDCCH receiving section 207, PDSCH receiving section 208, modulating sections 209 and 210, DFT (Discrete Fourier Transform) section 211, mapping section 212, IFFT section 213, CP adding section 214, RF transmitting section 215, and pilot generating section 216. Terminal 200 represents, for example, an LTE-A terminal.

Then, RF receiving section 202 applies reception radio processing (such as down-conversion and analog-to-digital (A/D) conversion) to a radio signal (OFDM signal in here) received in a reception band through antenna 201 and outputs the resulting received signal to CP removing section 203. The received signal includes a PDSCH signal, a PDCCH signal, higher layer control information including setting information.

CP removing section 203 removes a CP from the received signal, and FFT section 204 transforms the received signal from which the CP is removed into a frequency domain signal. This frequency domain signal is output to demultiplexing section 205.

Demultiplexing section 205 demultiplexes the signal input from FFT section 204 into a higher layer control signal described above (e.g., RRC signaling, for example), the PDCCH signal and a data signal (i.e., the PDSCH signal). Demultiplexing section 205 outputs the control signal to setting information receiving section 206, the PDCCH signal to PDCCH receiving section 207, and the PDSCH signal to PDSCH receiving section 208.

Setting information receiving section 206 reads a cell ID, hopping enable/disable information, hopping information, and an initial value of a sequence group from the control information input from demultiplexing section 205 and outputs the result to pilot generating section 216. Also, setting information receiving section 206 reads setting information from the control information and outputs the setting information to PDCCH receiving section 207.

PDCCH receiving section 207 extracts the PDCCH signal addressed to the terminal itself from the PDCCH signal received from demultiplexing section 205, based on the setting information input from setting information receiving section. PDCCH receiving section 207 outputs the downlink resource allocation information included in the PDCCH signal addressed to the terminal itself to PDSCH receiving section 208, and outputs the uplink resource allocation information to mapping section 212 and pilot generating section 216.

PDSCH receiving section 208 extracts reception data (downlink data) from the PDSCH signal received from demultiplexing section 205, based on the downlink resource allocation information received from PDCCH receiving section 207, Furthermore, PDSCH receiving section 208 performs error detection on the extracted reception data (downlink data). As the result of the error detection, PDSCH receiving section 208 generates a NACK signal as an ACK/NACK signal if the reception data includes an error, and PDSCH receiving section 208 generates an ACK signal as an ACK/NACK signal if the reception data does not include any error. The obtained ACK/NACK signal is output to modulating section 209.

Modulating section 209 modulates the ACK/NACK signal input from PDSCH receiving section 208, and outputs the modulated ACK/NACK signal to DFT section 211.

Modulating section 210 modulates transmission data (i.e., uplink data) and outputs the modulated data signal to DFT section 211.

DFT section 211 transforms the ACK/NACK signal input from modulating section 209 and the data signal from modulating section 210 into a frequency domain, and outputs the resulting plurality of frequency components to mapping section 212.

Pilot generating section 216 outputs a pilot sequence based on the information received from setting information receiving section 206, such as hopping enable/disable information, hopping information, cell ID information and an initial value of a sequence group.

In particular, when the hopping information indicates inter-slot hopping, pilot generating section 216 generates and outputs "first pilot sequence" where a group including a sequence used in each slot changes on a slot basis. Meanwhile, when the hopping information indicates inter-subframe hopping, pilot generating section 216 generates and outputs "second pilot sequence" where a group including a sequence used in each slot changes on a subframe basis. Here, the following relationship is established between "first pilot sequence" and "second pilot sequence" that are used for the channel estimation between a terminal itself and a base station apparatus. A sequence group including sequences used in any subframe in the second pilot sequence is identical to a sequence group including sequences used in any one of slots included in any subframe in the first pilot sequence. This relationship between "first pilot sequence" and "second pilot sequence" will be described later.

In particular, pilot generating section 216 decides a sequence group index allocated to the terminal itself, and drives a sequence length and a sequence index, based on the uplink resource allocation information output from PDCCH receiving section 207. That is, when the hopping enable/disable information indicates to enable the hopping, pilot generating section 216 performs the hopping, on a slot basis or on a subframe basis, on the sequence group index from the initial value of the sequence group index according to a hopping pattern derived from the cell ID, and drives a sequence group index to be used by each slot. Furthermore, among the allocated sequence group indexes, a sequence length and sequence index of a pilot signal corresponding to a transmission bandwidth of the uplink resource allocation information are determined. When the hopping enable/disable information indicates to disable hopping, pilot generating section 216 defines the initial value of the sequence group notified from setting information receiving section 206 as the sequence group index. Pilot generating section 216 then generates a sequence using the sequence length and sequence index, and outputs the sequence to mapping section 212.

Among a plurality of frequency components input from DFT section 211, mapping section 212 maps, to PUSCH, a frequency component corresponding to a data signal, and a frequency component of the pilot sequence input from pilot generating section 216, according to the uplink resource allocation information input from PDCCH receiving section 207. Among a plurality of frequency components input from DFT section 211, mapping section 212 maps the frequency component corresponding to the ACK/NACK signal to PUCCH. Although the ACK/NACK signal is mapped to PUCCH in here, the ACK/NACK signal may be mapped to PUSCH.

IFFT section 213 transforms a plurality of frequency components mapped to PUSCH and PUCCH into a time domain waveform, and CP adding section 214 adds a CP to this time domain waveform.

RP transmitting section 215 can change a transmission band and sets the transmission band, based on band information input from setting information receiving section 206. Then, RP transmitting section 215 applies transmission radio processing (such as up-conversion and digital-to-analog (D/A) conversion) to a transmission signal that is the time domain waveform and to which a CP is added, and transmits the result through antenna 201.

Here, modulating sections 209 and 210, DFT section 211, and mapping section 212 may be provided for each component band.

Preferably, PDCCH information including terminal specific allocation control information such as uplink resource allocation information, downlink resource allocation information, MCS information, HARQ information, and OCC information is changed dynamically according to a traffic situation. For this reason, the terminal specific allocation control information is notified through PDCCH at short notification intervals. However, when the traffic situation of each cell is not changed, notifying the higher layer information (that is, RRC signaling) sent at long notification intervals can reduce the traffic. Also, notifying a part of or all of this terminal specific allocation control information as broadcast information can further reduce the traffic. There is no need to change the hopping enable/disable information and the initial value of the sequence group, after once being set. These pieces of information may be notified as the broadcast information or higher layer information (RRC signaling) sent at long notification intervals. However, notifying a part of or all of these pieces of information through the PDCCH at the short notification intervals, the part of or all of these pieces of information can be more dynamically changed according to the traffic situation of each cell. In other words, flexible allocation is available.

The above communication system also includes an LTE terminal. The LTE terminal can use the inter-slot hopping only.

Operations of Base Station 100 and Terminal 200

Operations of base station 100 and terminal 200 having the above mentioned configurations will be described.

When the hopping information transmitted from base station 100 indicates the inter-slot hopping, terminal 200 transmits "first pilot sequence" where a group including a sequence used in each slot changes on a slot basis, to base station 100. Meanwhile, when the hopping information indicates the inter-subframe hopping, terminal 200 transmits "second pilot sequence" where a group including a sequence used in each slot changes on a subframe basis, to base station 100.

In particular, in terminal 200, pilot generating section 216 generates "first pilot sequence" or "second pilot sequence" having the following relationship, according to whether the hopping information indicates to enable the hopping or to disable the hopping.

At this time, pilot generating section 216 reuses the inter-slot hopping pattern of the first pilot sequence in order to perform the inter-subframe hopping of the second pilot sequence.

In particular, in terminal 200, pilot generating section 216 generates the relationship explained below between "first pilot sequence" and "second pilot sequence." Hereinafter, although an example will be explained using a case where a single subframe includes two slots (first slot and latter slot), the number of slots included in the subframe is not limited to this.

Relationship 1

In relationship 1, a sequence group including sequences used in any subframe in the second pilot sequence is identical to a sequence group including sequences used in the first slot included in the subframe in the first pilot sequence.

Figure 7:
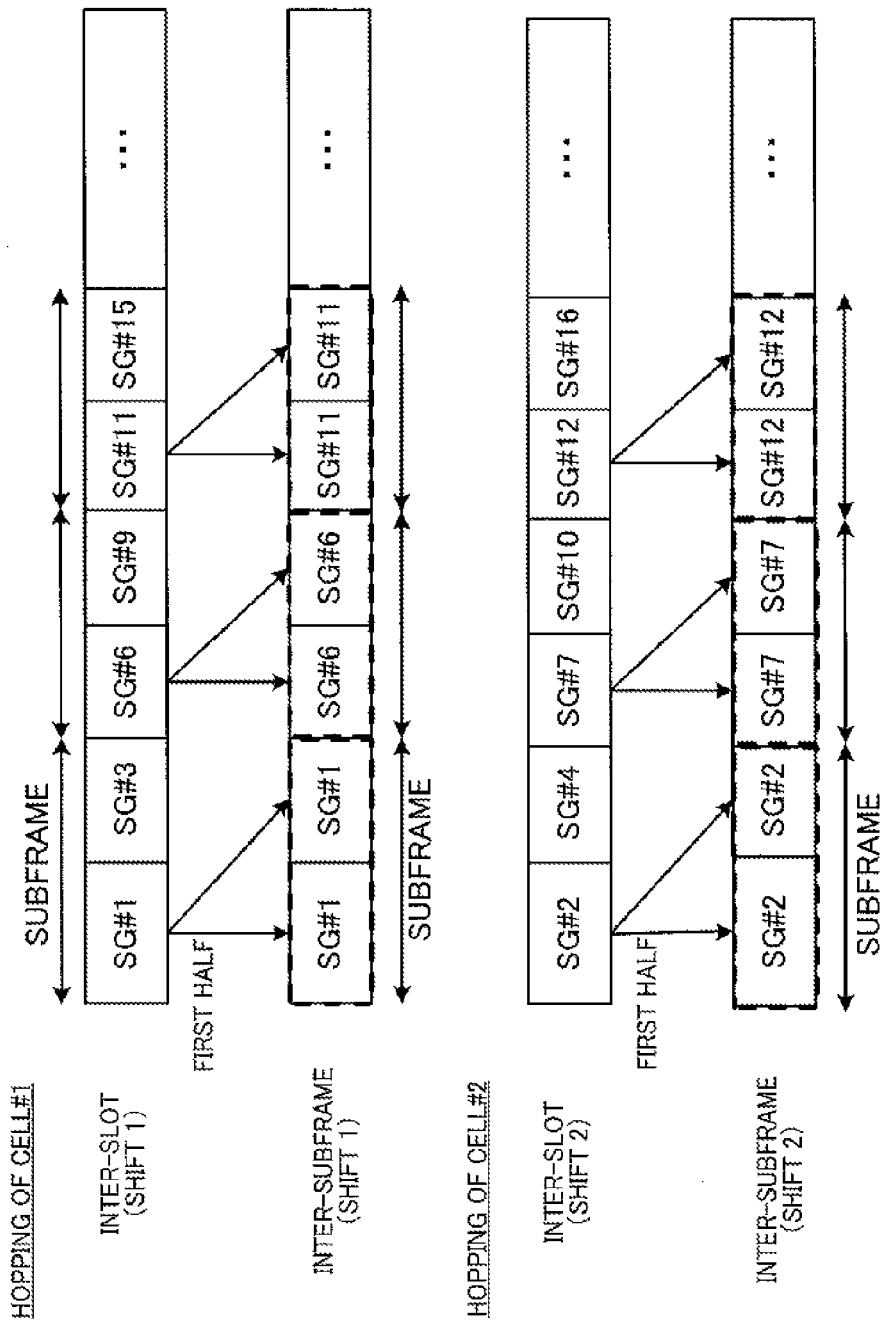
FIG. 7 shows a relationship between the inter-slot hopping pattern and the inter-subframe hopping pattern.

To be more specific, in cell#1 shown in FIG. 7, when the sequence group performs hopping in slots in order of SG#1, SG#3, SG#6, SG#9, . . . in the first pilot sequence, the second pilot sequence uses only the sequence group indexes of the first slots of the first pilot sequence and then the sequence groups of the slots become SG#1, SG#1, SG#6, SG#6, . . . .

This relationship can be formulated as follows. When the first pilot sequence of the inter-slot hopping is represented by the following equation 2, the second pilot sequence that is the inter-subframe hopping is represented by the following equation 3.

(Equation 2)

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad [2]$$

(Equation 3)

$$f_{gh}(n_s) = \begin{cases} 0 & \text{if group hopping is disabled} \\ \left(\sum_{i=0}^{7} c(8 \times \{2 \times \text{floor}(n_s/2)\} + i) \cdot 2^i\right) \bmod 30 & \text{if group hopping is enabled} \end{cases} \quad [3]$$

Here, $n_s$ represents a slot index, c(*) represents a pseudo random sequence (see, non-patent literature 1), and floor(x) indicates the smallest integer value that is the closest to x. Instead of floor(x), it is possible to formulate the relationship using ceil(x) indicating the largest integer value that is the closest to x, or, round(x) indicating the integer value that is the closest to x, without limiting it to floor(x).

Figure 8:
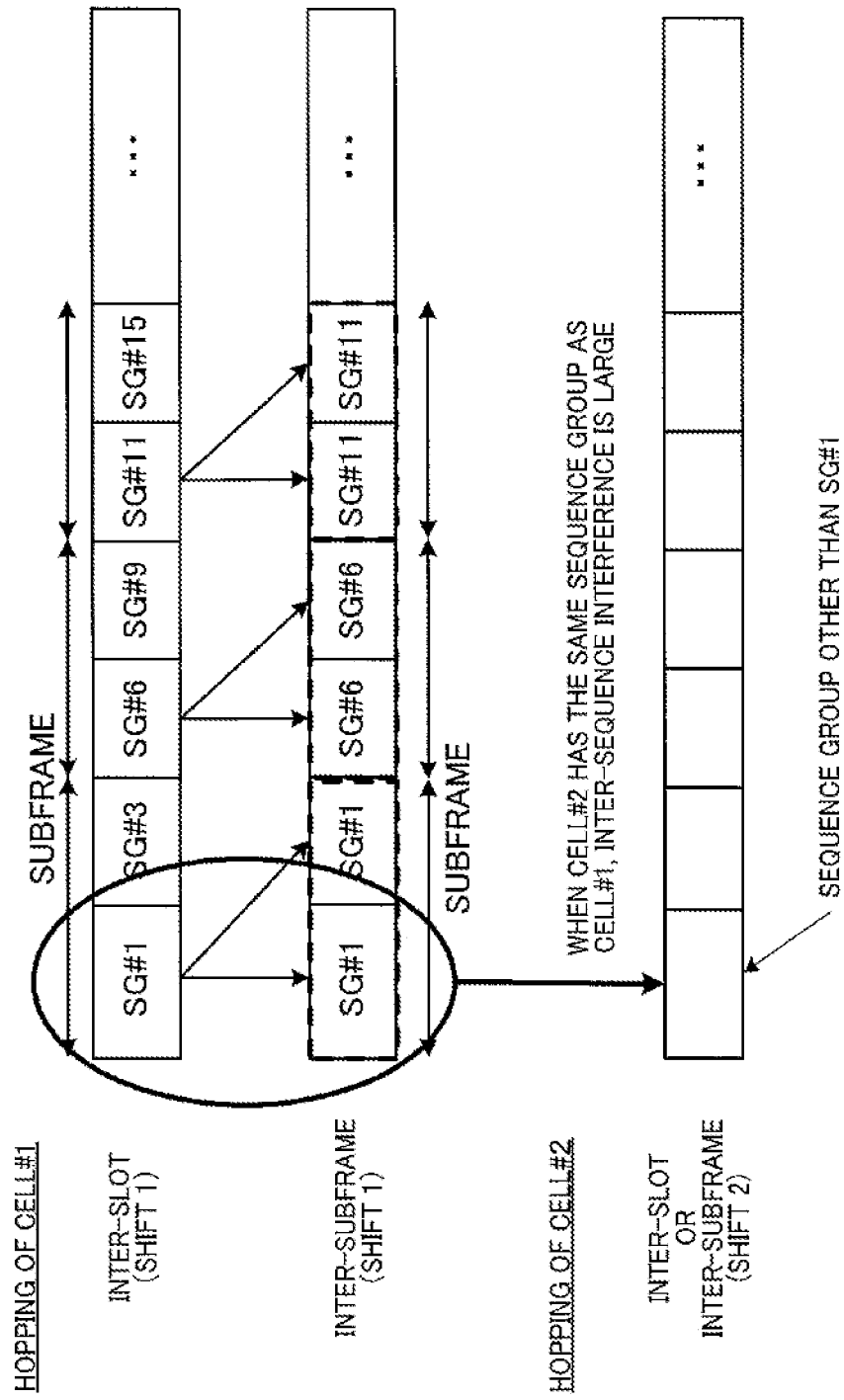
FIG. 8 shows a relationship between the inter-slot hopping pattern and the inter-subframe hopping pattern.

The above relationship leads to the following effect. The LTE terminal uses the inter-slot hopping, and the LTE-A terminal uses the inter-subframe hopping or the inter-slot hopping. Accordingly, both terminals exist in the LTE-A system. However, even in such a situation and even when the first pilot sequence and the second pilot sequence are used at the same time, one of slots in any subframe in a single cell uses a single sequence group only (see FIG. 8). That is, even when the first pilot sequence and the second pilot sequence are used at the same time, the second pilot sequence uses the sequence group included in the first pilot sequence, and therefore, focusing on a subframe basis, only two sequence groups are used in the single cell. This number of sequence groups is the same as that of when only the inter-slot hopping is used in the LTE system. As a result, even the inter-subframe hopping besides the inter-slot hopping is introduced besides the inter-slot hopping, it is possible to prevent the increase of inter-pilot signal interference in identical slots and further to maintain the flexibility of designing the cell cluster structure at the same level as that of the LTE system. In addition, since the pattern of the inter-slot hopping used in the LTE terminal is reused in the inter-subframe hopping, a circuit used in the LTE terminal can be reused in the LTE-A terminal.

In the above explanation, a sequence group including sequences used in any subframe in the second pilot sequence is set identical to a sequence group including sequences used in the first slot included in the subframe in the first pilot sequence, By contrast, the sequence group including the sequences used in any subframe in the second pilot sequence may be set identical to a sequence group including sequences used in the latter slot included in the subframe in the first pilot sequence. This case can be formulated by the following equation 4.

(Equation 4)

$$f_{gh}(n_s) = \begin{cases} 0 & \text{if group hopping is disabled} \\ \left(\sum_{i=0}^{7} c(8 \times \{2 \times \text{floor}(n_s/2) + 1\} + i) \cdot 2^i\right) \bmod 30 & \text{if group hopping is enabled} \end{cases} \quad [4]$$

Considering the current LTE system, there are more advantages in setting the sequence group including sequences used in any subframe in the second pilot sequence to be identical to the sequence group including the sequences used in the first slot included in the subframe in the first pilot sequence. In the LTE system, a pilot signal (SRS: Sounding Reference Signal) for measuring reception quality is transmitted by the last symbol in the latter slot. Thus, the latter slot transmits a less amount of data signal than the first slot. For this reason, it is necessary to enhance the accuracy of channel estimation of the first slot in which a larger amount of data exists. Accordingly, it is more effective to set the sequence group including the sequences used in the first slot included in any subframe in the first pilot sequence to be identical to the sequence group including the sequences used in the subframe in the second pilot sequence.

Also, in the sequence group used in the first or latter slot in the inter-slot hopping pattern, a sequence group used in the inter-subframe hopping pattern may be fixed or may be switched by a signaling of the higher layer signaling. The switching by the higher layer signaling enables a control according to the conditions of adjacent cells. The above switching may be performed for each cell. For example, in a cell whose cell ID is even, the sequence group used in the first slot in the inter-slot hopping pattern may be also used in the inter-subframe hopping pattern, and in a cell whose cell ID is odd, the sequence group used in the latter slot may be used in the inter-subframe hopping pattern. By this means, it is possible to implicitly notify the hopping pattern of the inter-subframe hopping, without increasing bits required for notifying. The above switching may be performed based on a UE ID or a subframe index, instead of the cell ID. For example, in an odd subframe, the sequence group used in the first slot of the inter-slot hopping pattern may be used in the inter-subframe hopping pattern, and, in an even subframe, the sequence group used in the latter slot may be used in the inter-subframe hopping pattern. That is, when $n_s$ is even, the above equation 3 holds true, and when $n_s$ is odd, the above equation 4 holds true. Alternatively, when $n_s$ is even, the above equation 4 holds true, and when $n_s$ is odd, the above equation 3 holds true. By this means, it is possible to change a slot having large inter-cell interference, for each subframe.

Also, a specified and default value (see, non-patent literature 3) that is the initial setting value may be set as a sequence group used in the first slot of the inter-subframe hopping pattern. A sequence group used in the latter slot may be switched by the higher layer signaling. Focusing on the SRS in the LTE system, it is more effective to use a sequence group used in the first slot in the inter-slot hopping pattern for the inter-subframe hopping pattern. For this reason, setting the sequence group used in the first slot in the inter-slot hopping pattern as the default value can prevent increase in overhead for notifying. That is, a terminal sets the default value when there is no notification of which sequence of the first slot or the latter slot in the inter-slot hopping pattern will be used in inter-subframe hopping pattern. Thus, when there is no need to change the setting from the default value, omission of the notification from a base station to the terminal can reduce the amount of notifying.

Relationship 2

In relationship 2, consecutive first frame and second frame establish the following relationship. To put it more specifically, as relationship 1, in the first frame, a sequence group including sequences used in any subframe in the second pilot sequence is identical to a sequence group including sequences used, in the first slot included in the subframe in the first pilot sequence. Meanwhile, in the second frame, a sequence group including sequences used in any subframe in the second pilot sequence is identical to a sequence group including sequences used in the latter slot not used in the first frame. The inter-slot hopping patterns are the same between the first frame and the second frame.

Figure 9:
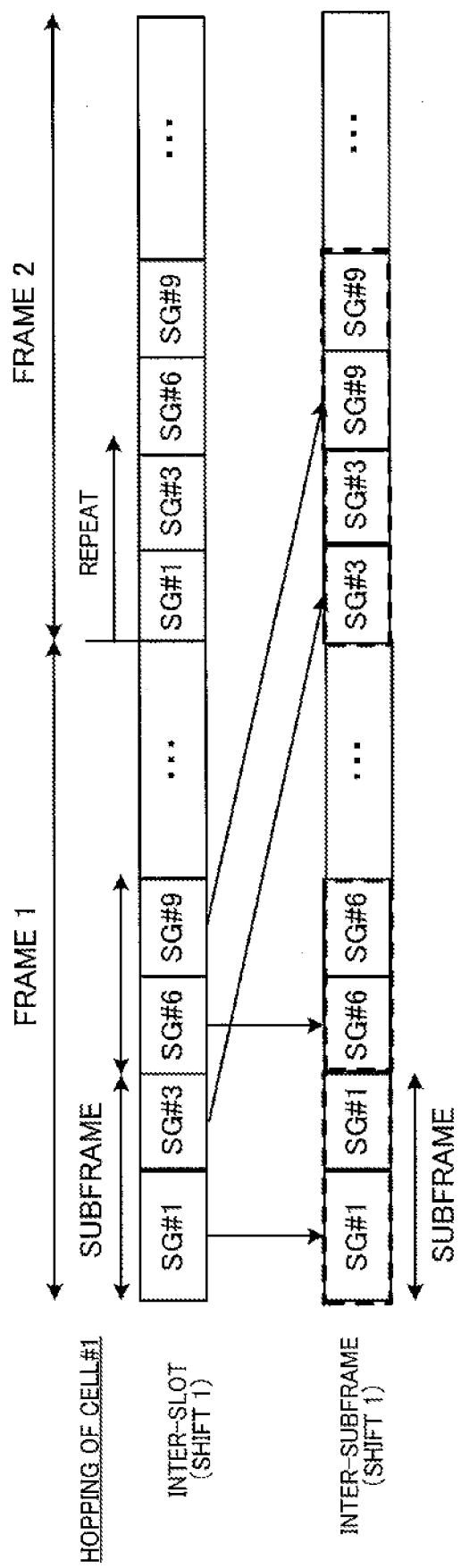
FIG. 9 shows a relationship between the inter-slot hopping pattern and the inter-subframe hopping pattern.

To be more specific, in frame 1 as shown in FIG. 9, when the sequence group in the first pilot sequence performs hopping in slots in order of SG#1, SG#3, SG#6, SG#9, ..., only sequence group indexes used in the first slot of the first pilot sequence are used in the second pilot sequence, and the sequence group in the second pilot sequence performs hopping in slots in order of SG#1, SG#1, SG#6, SG#6, .... Meanwhile, in frame 2, when the sequence group in the first pilot sequence performs hopping in slots in order of SG#1, SG#3, SG#6, SG#9, ..., only sequence group indexes of the latter slots of the first pilot sequence are used in the second pilot sequence, and the sequence group in the second pilot sequence thus performs hopping in slot in order of SG#3, SG#3, SG#9, SG#9, .... That is, the above equation 3 holds true in frame 1, and the above equation 4 holds true in frame 2.

Here, since the same sequence group is used in the same subframe in the inter-subframe hopping pattern, the number of times hopping is performed in one cycle of the hopping pattern decreases in comparison with the inter-slot hopping pattern. Thus, the effect of randomizing the inter-cell interference is small. Through the above relationship 2, the number of times the inter-subframe hopping is performed can be also made equal to that of the inter-slot, hopping, when two frames are viewed as one unit. Thus, it is made possible to enhance the effect of randomizing the inter-cell interference.

Also in the first frame, by switching the above setting of the first slot and the latter slot, the sequence group including the sequences used in any subframe in the second pilot sequence may be set identical to the sequence group including the sequence used in the latter slot included in the subframe in the first pilot sequence. Meanwhile, in the second frame, the sequence group including the sequences used in any subframe in the second pilot sequence may be set identical to the sequence group including the sequence used in the first slot not used in the first frame.

In the first frame, the sequence groups including the sequences used in each of even and odd subframes in the second pilot sequence is identical to the sequence groups including the sequences used in each of the first slot and the latter slot included in the subframe in the first pilot sequence, respectively. Also, in the second frame, the sequence groups including the sequences used in even and odd subframes in the second pilot sequence may be set identical to the sequence groups including the first slot and the latter slot not used in the first pilot sequence, respectively.

Relationship 3

Furthermore, in relationship 3 satisfying the above relationship 1, even when the first pilot sequence and the second pilot sequence case the same sequence groups, the first pilot sequence and the second pilot sequence use different sequences among a plurality of sequences corresponding to allocation resource block numbers in the sequence group.

Figure 10:
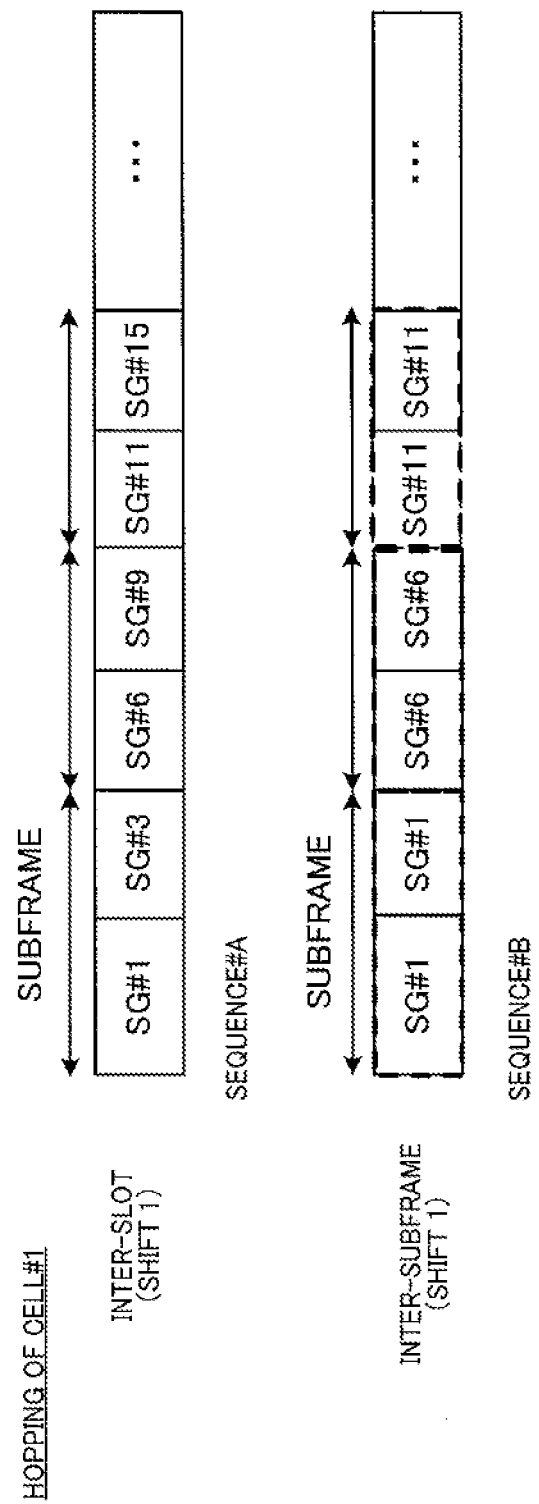
FIG. 10 shows a relationship between the inter-slot hopping pattern and the inter-subframe hopping pattern.

To be more specific, as shown in FIG. 10, while sequence #A of sequence index u corresponding to a u/N that is closest to the reference value (u/N in case of 3 RBs) is used as the first pilot sequence, sequence #B of sequence index u corresponding to a n/N that is second closest to the above reference value is used as the second pilot sequence. At this time, since only the sequence index that is the closest to the reference value (each u/N (u=1, 2, ..., 30, N=31) of 3 RBs) exists in the case of 5 RBs or below, sequence #A is used even for the inter-subframe hopping.

In the case in which a terminal using the inter-slot hopping and a terminal using the inter-subframe hopping exist together even when relationship 1 is used, two sequence groups are used at the same time in one of two slots included in any subframe. Thus, there is a high probability of increasing the inter-cell interference. As described above, when the inter-slot hopping is applied, all slots in the LTE system use sequence #A only. Thus, since there is a low probability for sequence #B to be used in adjacent cells in comparison with sequence #A, the inter-cell interference is small.

By this means, the application of the above relationship 3 sets a sequence used in the inter-subframe hopping to be different from a sequence used in the inter-slot hopping and then reduces the inter-cell interference.

The sequence (#A or #B) used in the inter-subframe hopping may be switched according to a notice from a higher layer. For example, the specified and default value may be firstly set as sequence #B and then switched to sequence #A according to the notice from the higher layer. When the inter-slot hopping is applied by an LTE terminal, only sequence #A is used. Thus, the usage of sequence #A by an LTE-A terminal leads to a high probability of increasing the inter-cell interference. In this case, setting sequence #B as the default value to an LTE-A terminal using the inter-subframe hopping prevents the increase in overhead for notifying and reduces the inter-cell interference.

Also, in the LTE system, sequence hopping other than the hopping of a sequence group is used. While the sequence hopping enable/disable information may be notified by the higher layer, the LTE system may be always fixed with no sequence hopping if the inter-subframe hopping of the sequence group is used. By this means, signaling to notify the sequence hopping enable/disable information can be reduced. Also, the inter-subframe hopping assumes the application of OCC, and the application of OCC requires a setting not to apply the sequence hopping. Thus, when applying the inter-subframe hopping, the LTE system may always be set not to apply the sequence hopping.

Also, the following two methods are considered as the methods to generate the first pilot sequence of the inter-slot hopping pattern represented by the above equation 2.

(Method 1) Generate an array of sequence group indexes of the inter-slot hopping using equation 2 and extract only a sequence group index required for the inter-subframe hopping from the array of the sequence group indexes of the slots.

(Method 2) Substitute only a slot index required for the sequence group index for equation 2 and calculate only the sequence group index required for the inter-subframe hopping.

Although the above description has assumed a case where two slots exist in a subframe, the present invention can be applied even in a case where, for example, four, eight, sixteen slots exist in the subframe.

Although the OCC has been used in the above description, the present invention is likewise applicable to any orthogonal sequence or sequence with high orthogonality. For example, the OCC may be replaced with a Walsh sequence. Although the ZC sequence has been used in the above description, the ZC sequence may be replaced with the orthogonal sequence or the sequence with high orthogonality.

Although a case has been described with the above explanation as an example where the present invention is implemented with hardware, the present invention can be implemented with software in cooperation with the hardware.

Furthermore, each function block employed in the description of the above explanation may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Furthermore, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Furthermore, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2010-075243, filed on Mar. 29, 2010, including the specification, drawings and abstract, is incorporated herein by reference in its entirety.

INDUSTRIAL APPLICABILITY

Even when the inter-slot hopping and the inter-subframe hopping are applied, the terminal apparatus, the base station apparatus, the pilot transmitting method, and the channel estimating method of the present invention are useful to prevent the increase of the interference among the pilot signals in the identical slots and to prevent the reduction in the flexibility of designing the cell cluster structure.

REFERENCE SIGNS LIST

100 Base station
101 Setting section
102 Pilot processing section
103, 104, 105 Coding/modulating section
106 Multiplexing section
107, 213 IFFT section
108, 214 CP adding section
109, 215 RF transmitting section
110, 201 Antenna
111, 202 RF receiving section
112, 203 CP removing section
113, 204 FFT section
114 Extraction section
115 Frequency equalizing section
116 IDPT section
117 Data receiving section
118 ACK/NACK receiving section
121 PDCCH information setting section
122 Higher layer information setting section
200 Terminal
205 Demultiplexing section
206 Soiling information receiving section
207 PDCCH receiving section
208 PDSCH receiving section
209, 210 Modulating section
211 DFT section
212 Mapping section
216 Pilot generating section

The invention claimed is:

1. A terminal apparatus comprising:
a reception section configured to receive a control signal including hopping information;
a generation section configured to generate a first pilot sequence in a group to which a sequence used in each slot belongs changes on a slot basis, when the hopping information indicates inter-slot hopping, and generate a second pilot sequence in a group to which a sequence used in each slot belongs changes on a subframe basis, when the hopping information indicates inter-subframe hopping; and
a transmission section configured to transmit a signal including the first pilot sequence or the second pilot sequence generated by the generation section,
wherein a sequence group to which a sequence used in any subframe belongs in the second pilot sequence is identical to a sequence group to which a sequence used in any one of the slots included in the subframe belongs in the first pilot sequence.

2. The terminal apparatus according to claim 1, wherein:
the number of allocation resource blocks is associated with a plurality of sequences in the group; and
the first pilot sequence and the second pilot sequence to be generated by the generation section use different sequences in the plurality of sequences.

3. The terminal apparatus according to claim 2, wherein the plurality of sequences are each a sequence whose u/N value is closest to a reference value or a sequence whose u/N value is second closest to a reference value, where u is a sequence index and N is a sequence length.

4. The terminal apparatus according to claim 1, wherein a sequence group used in any subframe included a first frame in the second pilot sequence is identical to a sequence group to which a sequence used in a first slot included in the subframe belongs in the first pilot sequence, and a sequence group used in the corresponding subframe included a second frame consecutive to the first frame is identical to a sequence group to which a sequence used in a second slot included in the subframe belongs in the first pilot sequence.

5. A base station apparatus comprising:
a setting section configured to set a hopping type of a pilot signal for a terminal, the pilot signal being transmitted by the terminal; and
an estimation section configured to perform channel estimation between the terminal and the base station apparatus using a first pilot sequence in a group to which a sequence used in each slot belongs changes on a slot basis, when the set hopping type is inter-slot hopping, and performs channel estimation between the terminal and the base station apparatus using a second pilot sequence in a group to which a sequence used in each slot belongs changes on a subframe basis, when the set hopping type is inter-subframe hopping,
wherein a sequence group to which a sequence used in any subframe belongs in the second pilot sequence is identical to a sequence group to which a sequence used in any one of slots included in the subframe belongs in the first pilot sequence.

6. The radio base apparatus according to claim 5, wherein:
the number of allocation resource blocks is associated with a plurality of sequences in the group; and
the first pilot sequence and the second pilot sequence to be used in the estimation section use different sequences in the plurality of sequences.

7. The radio base apparatus according to claim 6, wherein: the plurality of sequences are each a sequence whose u/N value is closest to a reference value or a sequence whose u/N value is second closest to a reference value, where u is a sequence index and N is a sequence length.

8. The radio base apparatus according to claim 7, wherein a sequence group used in any subframe included a first frame in the second pilot sequence is identical to a sequence group to which sequence used in a first slot included in the subframe belongs in the first pilot sequence, and a sequence group used in the corresponding subframe included a second frame consecutive to the first frame is identical to a sequence group to which a sequence used in a second slot included in the subframe belongs in the first pilot sequence.

9. A pilot transmitting method comprising the steps of:
receiving a control signal including hopping information;
generating a first pilot sequence in a group to which a sequence used in each slot belongs changes on a slot basis, when the hopping information indicates inter-slot hopping, and generating a second pilot sequence in a group to which a sequence used in each slot belongs changes on a subframe basis, when the hopping information indicates inter-subframe hopping; and
transmitting a signal including the generated first pilot, sequence or the generated second pilot sequence,
wherein a sequence group to which a sequence used in any subframe belongs in the second pilot sequence is identical to a sequence group to which a sequence used in any one of the slots included in the subframe belongs in the first pilot sequence.

10. A channel estimating method comprising the steps of:
setting a hopping type of a pilot signal for a terminal, the pilot signal being transmitted by the terminal; and
performing channel estimation using a first pilot sequence in a group to which a sequence used in each slot belongs changes on a slot basis, when the set hopping type is inter-slot hopping, and performing channel estimation using a second pilot sequence in a group to which a sequence used in each slot belongs changes on a subframe basis, when the set hopping type is inter-subframe hopping,
wherein a sequence group to which a sequence used in any subframe belongs in the second pilot sequence is identical to a sequence group to which a sequence used in any one of slots included in the subframe belongs in the first pilot sequence.

* * * * *